(12) United States Patent
Li

(10) Patent No.: US 8,223,732 B2
(45) Date of Patent: Jul. 17, 2012

(54) METHOD AND APPARATUS FOR BALANCING LOAD ACROSS ACCESS DEVICES IN A WIRELESS NETWORK

(75) Inventor: Aihua E. Li, Cupertino, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 1000 days.

(21) Appl. No.: 12/141,685

(22) Filed: Jun. 18, 2008

(65) Prior Publication Data

US 2009/0318160 A1    Dec. 24, 2009

(51) Int. Cl.
*H04W 72/00* (2009.01)
*H04W 4/00* (2009.01)
(52) U.S. Cl. .................. 370/338; 370/328; 455/453
(58) Field of Classification Search .............. 455/456, 455/453; 370/328, 338
See application file for complete search history.

(56) References Cited

U.S. PATENT DOCUMENTS

| | | | |
|---|---|---|---|
| 7,222,175 B2 | 5/2007 | Knauerhase et al. | |
| 7,454,213 B2 | 11/2008 | Tolli | |
| 7,480,264 B1* | 1/2009 | Duo et al. | 370/310.2 |
| 7,494,062 B2* | 2/2009 | Holz et al. | 235/435 |
| 7,813,717 B2* | 10/2010 | Huotari et al. | 455/411 |
| 7,881,208 B1* | 2/2011 | Nosella et al. | 370/242 |
| 2001/0055283 A1* | 12/2001 | Beach | 370/328 |
| 2003/0084287 A1* | 5/2003 | Wang et al. | 713/168 |
| 2004/0053624 A1 | 3/2004 | Frank et al. | |
| 2004/0199668 A1* | 10/2004 | Lin et al. | 709/241 |
| 2005/0157676 A1 | 7/2005 | Kwak et al. | |
| 2005/0169183 A1 | 8/2005 | Lakkakorpi et al. | |
| 2005/0260996 A1 | 11/2005 | Groenendaal | |
| 2005/0265283 A1 | 12/2005 | Qi et al. | |
| 2006/0045272 A1* | 3/2006 | Ohaka | 380/270 |
| 2006/0154609 A1 | 7/2006 | Takano | |
| 2006/0239207 A1 | 10/2006 | Naghian | |
| 2007/0060105 A1* | 3/2007 | Batta | 455/410 |
| 2007/0076671 A1* | 4/2007 | Winget et al. | 370/338 |
| 2007/0204046 A1 | 8/2007 | Batta et al. | |
| 2007/0280176 A1* | 12/2007 | Silverman et al. | 370/338 |
| 2008/0049687 A1 | 2/2008 | Shankar et al. | |
| 2008/0096575 A1 | 4/2008 | Aragon et al. | |
| 2008/0170497 A1* | 7/2008 | Jeong et al. | 370/230 |
| 2008/0316983 A1* | 12/2008 | Daigle | 370/338 |

(Continued)

FOREIGN PATENT DOCUMENTS

| | | |
|---|---|---|
| EP | 1401150 A2 | 3/2004 |
| WO | 2005055524 A1 | 6/2005 |

(Continued)

OTHER PUBLICATIONS

Non Final Office Action mailed May 13, 2011, in related U.S. Appl. No. 12/567,928, Aihua Edward Li., filed Sep. 28, 2009.

(Continued)

*Primary Examiner* — Nathan Mitchell

(57) ABSTRACT

Apparatus and methods are provided for balancing a load across access devices in a wireless network. A method comprises receiving an association request at a first access device of a plurality of access devices, and determining, in response to the association request, if the first access device is the least-loaded access device among the plurality of access devices. The method further comprises granting the association request if the first access device is the least-loaded access device. If the first access device is not the least-loaded access device, the method may further comprise denying the association request.

9 Claims, 4 Drawing Sheets

U.S. PATENT DOCUMENTS

| | | | |
|---|---|---|---|
| 2009/0143046 A1 | 6/2009 | Smith | |
| 2009/0177782 A1 | 7/2009 | Blatherwick et al. | |
| 2009/0190500 A1* | 7/2009 | Ji et al. | 370/254 |
| 2009/0285159 A1 | 11/2009 | Rezaiifar et al. | |
| 2011/0164520 A1* | 7/2011 | Kostic et al. | 370/252 |

FOREIGN PATENT DOCUMENTS

| | | |
|---|---|---|
| WO | 2009056164 A1 | 5/2009 |

OTHER PUBLICATIONS

Final Office Action mailed Oct. 5, 2011 in related U.S. Appl. No. 12/567,928, Aihua Edward Li., filed Sep. 28, 2009.

International Search Report & Written Opinion for International Application No. PCT/US2010/047116 mailed on Nov. 10, 2010.

* cited by examiner

METHOD AND APPARATUS FOR BALANCING LOAD ACROSS ACCESS DEVICES IN A WIRELESS NETWORK

TECHNICAL FIELD

Embodiments of the subject matter described herein relate generally to wireless network infrastructures, and more particularly, embodiments of the subject matter relate to automatically balancing the load among access points in a wireless network.

BACKGROUND

Most wireless networks (such as wireless local area networks or WLANs), rely on infrastructure components that establish data communication links with mobile devices. A mobile device communicates, via a wireless data communication channel, with a wireless access device (such as an access point or access port device), which in turn communicates with other network components via traditional wired interfaces. These wireless access devices generally communicate with the mobile devices using one or more RF channels (e.g., in accordance with one or more of the IEEE 802.11 standards).

Often, it is desirable to balance the load created by the various mobile devices among the access devices in the wireless network. Some existing techniques use proprietary protocols and/or predefined load criteria, and thus are limited in application to devices, systems, and/or networks compatible with these proprietary protocols or predefined load criteria. These proprietary methods are often inadequate or ineffective, as in most wireless networks, there will be numerous different brands or types of access devices and mobile devices from various manufacturers or vendors.

Additionally, some techniques utilize load advertising in beacons and probe responses, which provides load information from the access devices to a mobile device. The mobile device then determines which access device to connect to for purposes of load balancing, as opposed to the wireless network infrastructure. Thus, the ability of a system designer and/or network administrator to balance the load among access devices is largely dependent on the mobile devices in the wireless network. Furthermore, the administrator of the wireless network is limited in the ability to define or modify the criteria used to balance the load.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
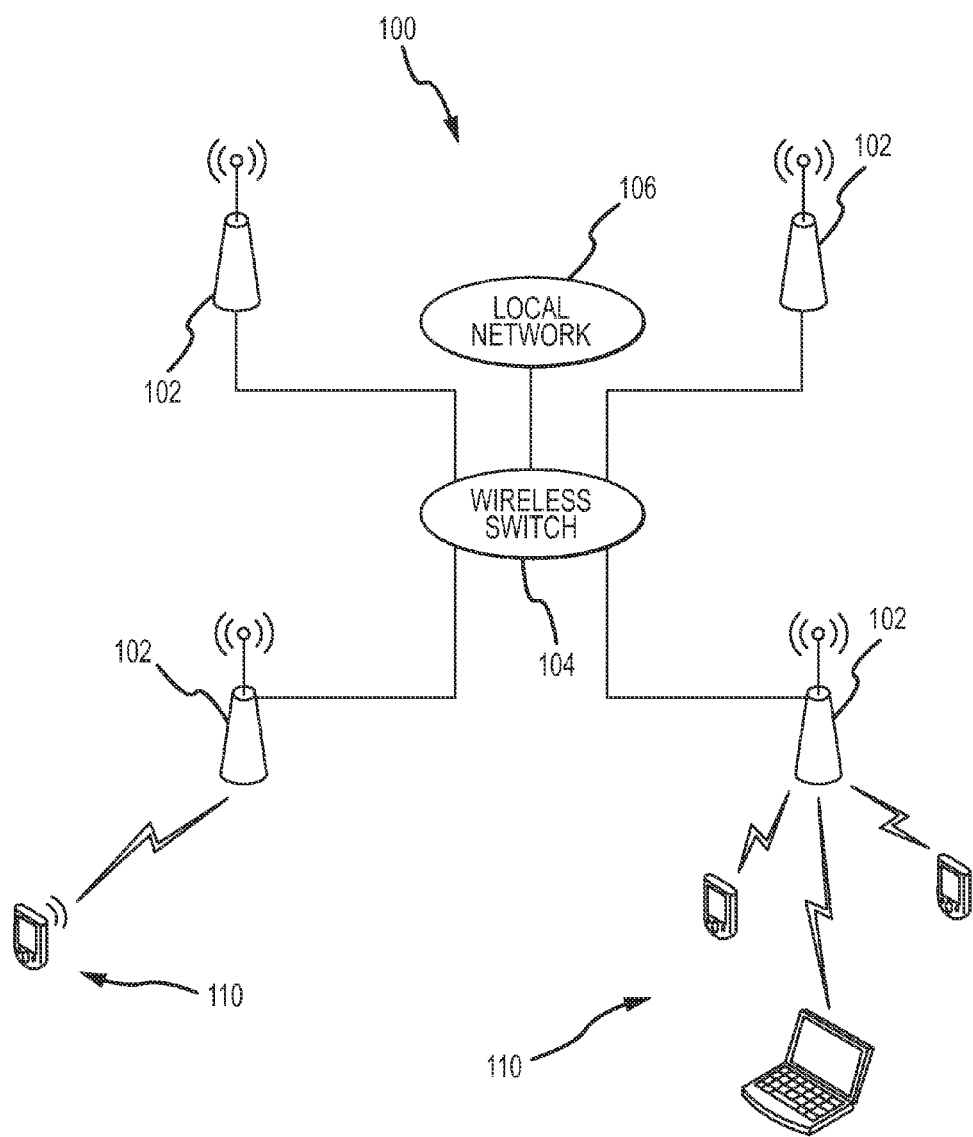
FIG. 1 is a schematic representation of an exemplary wireless network in accordance with one embodiment.

The following detailed description is merely illustrative in nature and is not intended to limit the embodiments of the subject matter or the application and uses of such embodiments. Furthermore, there is no intention to be bound by any expressed or implied theory presented in the preceding technical field, background, brief summary or the following detailed description.

Techniques and technologies may be described herein in terms of functional and/or logical block components and various processing steps. It should be appreciated that such block components may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments may be practiced in conjunction with any number of network architectures, data transmission protocols, and mobile device configurations, and that the system described herein is merely one suitable example.

For the sake of brevity, conventional techniques related to wireless signal processing, wireless data transmission, WLANs, signaling, network control, wireless switches, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically.

Those of skill in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application.

Technologies and/or concepts described herein related to systems and methods for automatically balancing the load generated by mobile devices among access devices in a wireless network. The load may be balanced in a manner that is customizable and independent of the types of devices in the wireless network.

Referring now to FIG. 1, in an exemplary embodiment, a wireless network 100 includes, without limitation, a plurality of wireless access devices 102 and a wireless switch 104. In an exemplary embodiment, the wireless network 100 is configured to support communications between and/or among mobile devices 110, and may include additional devices to support the functionality of the wireless network 100, such as Ethernet switches, and the like. In this embodiment, the wireless access devices 102 are access ports that cooperate with the wireless switch. In alternate embodiments, the wireless access devices 102 can be realized as access points that include embedded processing capabilities that take the place of that normally provided by a wireless switch. It should be appreciated that the wireless switch 104 may not be used in such alternate embodiments, and that the features and/or functionality described below in the context of the wireless switch 104 may be equivalently incorporated into the access devices 102 in such embodiments that do not include a wireless switch 104.

The wireless switch 104 may be coupled to a local network 106, which in turn may be coupled to one or more additional components and/or computer networks, as will be understood. It should be understood that FIG. 1 is a simplified representation of a wireless network 100 for purposes of explanation. A practical embodiment may have any number of wireless switches 104, each supporting any number of wireless access devices 102, and each wireless access device supporting any number of mobile devices 110. The topology and configuration of the wireless network 100 can vary to suit the needs of the particular application, and FIG. 1 is not intended to limit the application or scope of the subject matter in any way.

In an exemplary embodiment, the wireless network 100 is configured as a wireless local area network (WLAN). In alternative embodiments, the wireless network 100 may be configured as a wireless personal area network (WPAN), a wireless wide area network (WWAN), or any other suitable network configuration. The wireless network 100 may be configured to utilize a data communication protocol in accordance with IEEE 802.11, conventional Internet Protocol techniques, TCP/IP, hypertext transfer protocol (HTTP), SOAP, or another comparable protocol.

In an exemplary embodiment, the wireless access devices 102 are coupled to the wireless switch 104. Depending on the embodiment, the wireless access devices 102 may be coupled to the wireless switch 104 via one or more additional access devices, wireless switches, Ethernet switches, routers, and/or various combinations thereof. In an exemplary embodiment, the wireless access devices 102 are configured to receive data from mobile devices 110 over wireless data communication links. Once that data is captured by the wireless access device 102, the data may be encapsulated (e.g., into a packet format compliant with a suitable data communication protocol) for communication to another access device 102, a mobile device 110, and/or the local network 106, as will be understood. In an exemplary embodiment, the wireless access devices 102 are realized as wireless access points, which rely on the network intelligence and management functions provided by the wireless switch 104, as described in greater detail below. It should be understood that in alternative embodiments, the wireless access devices 102 may include network intelligence and management functions incorporated therein.

A mobile device 110 may be realized using any suitable platform, including, without limitation: a cellular telephone; a personal digital assistant; a digital media player; a portable video game device; a laptop or other portable computer; or the like. In an exemplary embodiment, a mobile device 110 is configured to periodically scan for access devices 102, and maintain a list and/or table of the access devices 102 having a signal strength that indicates the mobile device 110 is within the communication range of the access device 102. For example, a mobile device 110 may receive broadcast messages and/or beacon signals from access devices 102 within communication range advertising their identity (e.g., service set identifier (SSID) or media access control (MAC) address). The mobile device 110 may then be configured to select an access device from the list of access devices within range, and send an association request to the selected access device. The mobile device 110 may automatically select the access device based on signal strength, in a random order, prompt a user for manually selecting an access device, or select an access device in some other manner. It should be appreciated that the functionality of the mobile device 110 will largely be dependent on the user, manufacturer, or vendor responsible for configuring and/or designing the mobile device, and the subject matter described herein is not limited to a specific manner of identifying an access device and making an association request.

In an exemplary embodiment, a mobile device 110 sends an association request, which may include information about the mobile device 110 (e.g., supported data rates) and the identity of the access device and/or network it wishes to associate with. In an exemplary embodiment, the access devices 102 are configured to route the association request to the wireless switch 104 for analyzing and responding to the association request, as described in greater detail below. In general, the wireless switch 104 sends an association response containing an acceptance or rejection notice to the mobile device 110 requesting association via an access device 102. If the association is granted, the wireless switch 104 may also provide information regarding the association, such as supported data rates or association identification, as will be understood.

Figure 2:
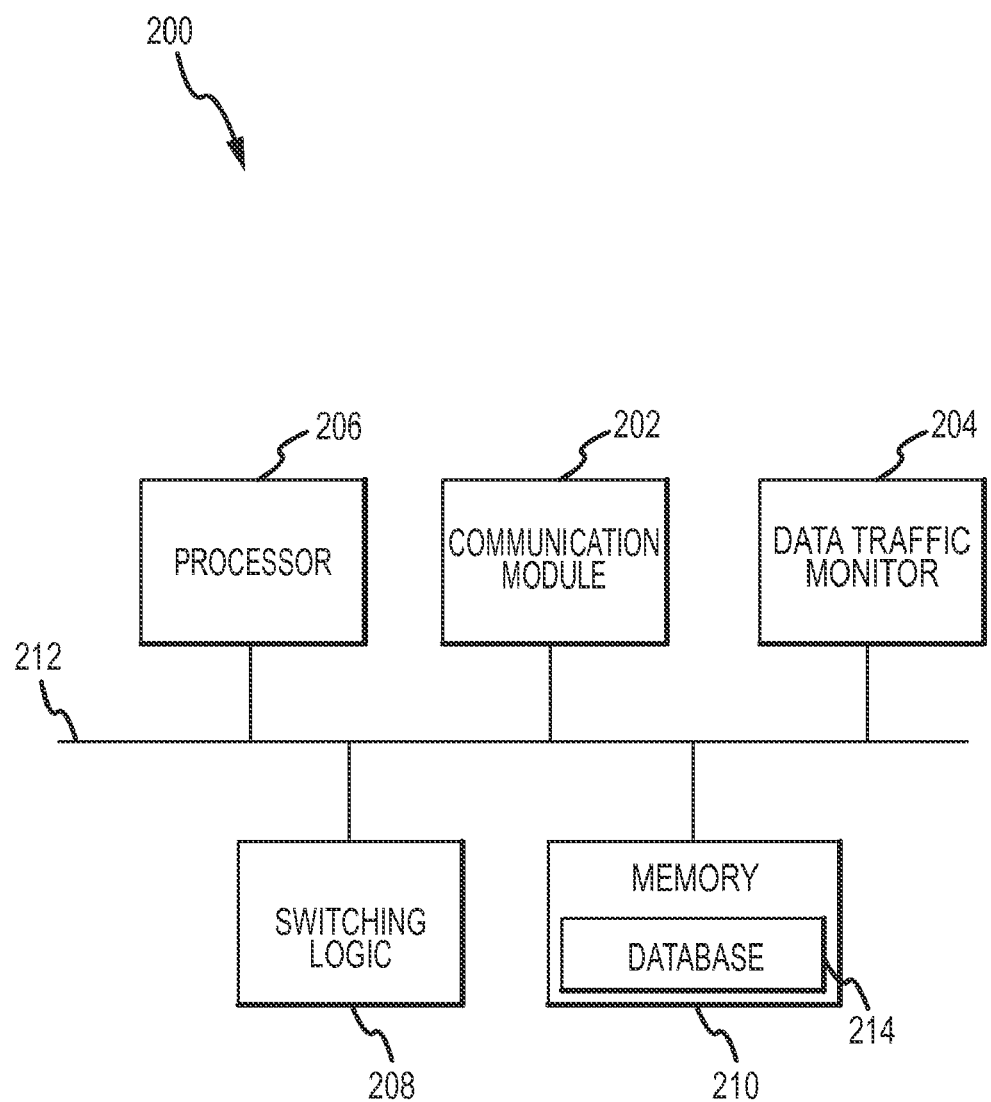
FIG. 2 is a schematic representation of an exemplary wireless switch suitable for use in the wireless network shown in FIG. 1 in accordance with one embodiment.

FIG. 2 is a schematic representation of an embodiment of a wireless switch 200 suitable for use in a network, such as wireless network 100 shown in FIG. 1. In an exemplary embodiment, a wireless switch 200 may include, without limitation: a communication module 202, a data traffic monitor 204, a processor 206, switching logic 208, and a suitable amount of memory 210. The elements of wireless switch 200 may be interconnected together using a bus 212 or another suitable interconnection arrangement that facilitates communication between the various elements of wireless switch 200. It should be appreciated that FIG. 2 depicts the wireless switch 200 in an oversimplified manner, and a practical embodiment may include additional components and suitably configured processing logic to support known or conventional operating features that are not described in detail herein.

In an exemplary embodiment, wireless switch 200 contains intelligence and processing logic that facilitates centralized control and management of WLAN elements, including wireless access devices associated with wireless switch 200. In an exemplary embodiment, one wireless switch 200 can support any number of wireless access devices (limited only by practical considerations). Thus, wireless switch 200 can serve multiple wireless access devices, which in turn can serve multiple mobile devices. Wireless switch 200 is suitably configured to transmit and receive data, and it may serve as a point of interconnection between a WLAN and a fixed wire (e.g., Ethernet) network. In practice, the number of wireless switches 200 in a given network may vary depending on the number of network users and the physical size of the network.

In an exemplary embodiment, communication module 202 generally represents the hardware, software, firmware, processing logic, and/or other components of wireless switch 200 that enable bidirectional communication between wireless switch 200 and network components to which wireless switch 200 is coupled. For example, referring to FIG. 1, communication module 202 is suitably configured to communicate with components on the wireless network 100, such as the wireless access devices 102 and/or the local network 106. In accordance with one embodiment, communication module 202 provides an Ethernet interface such that wireless switch 200 can communicate with a conventional Ethernet-based computer network. In this regard, communication module 202 may include a physical interface for connection to the computer network, and communication module 202 (and/or processor 206) may handle Ethernet addressing for data packets sent from wireless switch 200.

In an exemplary embodiment, the communication module 202 may support one or more wireless data communication protocols that are also supported by the wireless network infrastructure. Any number of suitable wireless data communication protocols, techniques, or methodologies may be supported by communication module 202, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; cellular/wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB. In an exemplary embodiment, communication module 202 is preferably compliant with at least the IEEE 802.11 specification and configured to receive association requests via access devices coupled to the wireless switch 200, as described below. Communication module 202 may include or be realized as hardware, software, and/or firmware, as will be appreciated in the art.

In an exemplary embodiment, data traffic monitor 204 is configured to monitor the flow or amount of data processed by wireless switch 200. Data traffic monitor 204 may be implemented or performed with a processor 206, a content addressable memory, a digital signal processor, an application specific integrated circuit, a field programmable gate array, any suitable programmable logic device, discrete gate or transistor logic, discrete hardware components, or any combination thereof, designed to perform the functions described below. In an exemplary embodiment, data traffic monitor 204 can monitor the throughput, data rate, data volume, packet count, an average data rate, an average data volume, or any quantity or characteristic based upon empirical or statistical information. The monitored data may be unidirectional or bidirectional, depending upon the specific application. In an exemplary embodiment, the data traffic monitor 204 is configured to monitor data and/or network traffic for the individual access devices. For example, the data traffic monitor 204 may implement a table (or list, cache, database or another suitable data structure) that maintains associations of the monitored data and/or statistics with the respective access device transmitting/receiving the data for those access devices associated with the wireless switch 200. As described in more detail below, the information obtained by data traffic monitor 204 can be utilized to balance the load among wireless access devices in a wireless network.

In an exemplary embodiment, the processor 206 may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this regard, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration. In practice, processor 206 includes processing logic that may be configured to carry out the functions, techniques, and processing tasks associated with the operation of the wireless switch 200, as described in greater detail below. Furthermore, the steps of a method or algorithm described in connection with the embodiments disclosed herein may be embodied directly in hardware, in firmware, in a software module executed by processor 206, or in any practical combination thereof.

In an exemplary embodiment, switching logic 208, which may be partially or completely realized in the processor 206, represents processing logic and functionality associated with the data switching and communicating features of wireless switch 200. Switching logic 208 may be configured to perform conventional operations that enable data traffic in the wireless network to be communicated between mobile devices, access devices, network infrastructure components, and network-based systems or applications. In an exemplary embodiment, switching logic 208 and processor 206 may be cooperatively configured to implement processing logic and functionality associated with the handling of association requests that originate at mobile devices, as described in greater detail below.

In an exemplary embodiment, memory 210 includes sufficient data storage capacity to support the operation of wireless switch 200. Memory 210 may be realized as RAM memory, flash memory, registers, a hard disk, a removable disk, or any other form of storage medium known in the art. In this regard, memory 210 can be coupled to processor 206 such that processor 206 can read information from, and write information to, memory 210. In the alternative, memory 210 may be integral to processor 206. In accordance with one embodiment, one or more software modules may reside in memory 210. In an exemplary embodiment, memory 210 is utilized to store information associated with various wireless access devices or mobile devices associated with the wireless switch 200 in a database 214, as described in greater detail below.

Figure 3:
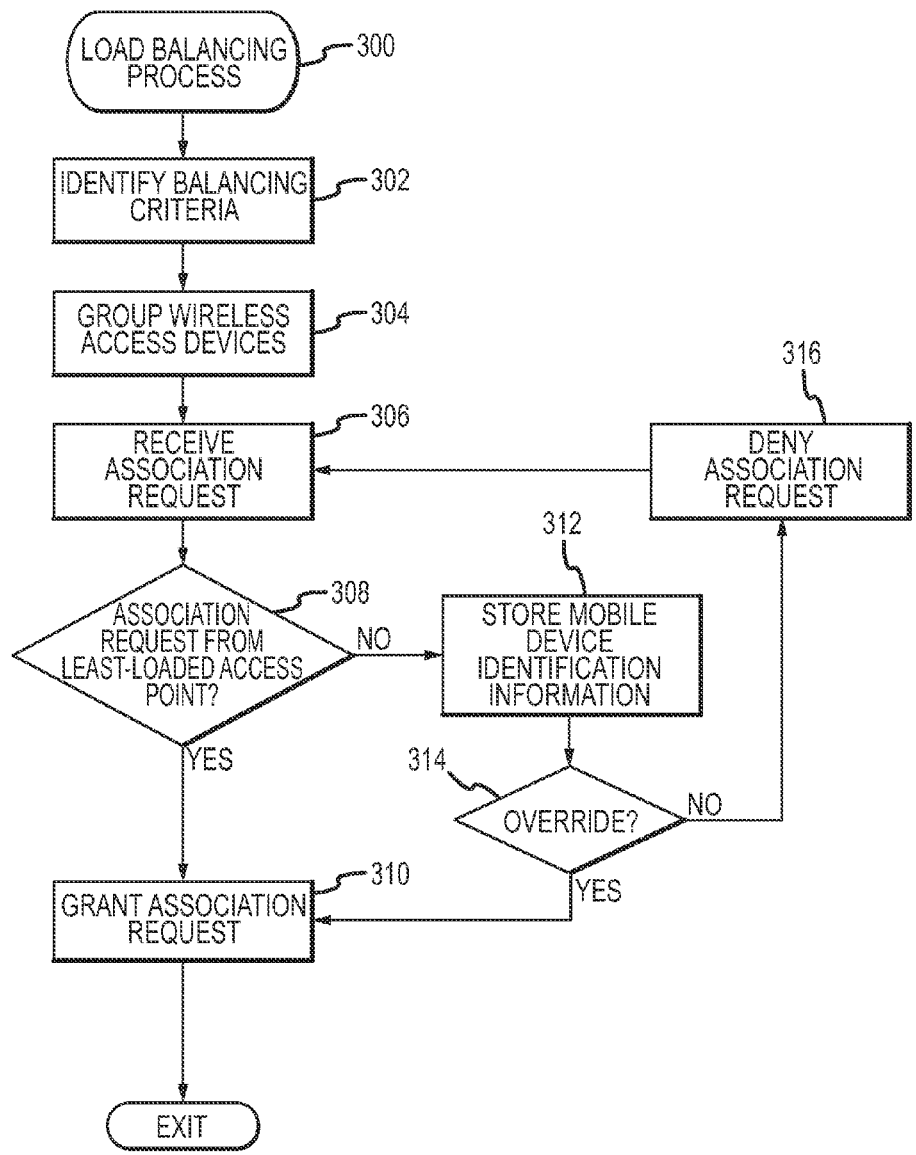
FIG. 3 is a flow diagram of a load balancing process in accordance with one embodiment.

Referring now to FIG. 3, in an exemplary embodiment, a wireless network 100 may be configured to perform a load balancing process 300 and additional tasks, functions, and/or operations as described below. The various tasks may be performed by software, hardware, firmware, or any combination thereof For illustrative purposes, the following description may refer to elements mentioned above in connection with FIG. 1 and FIG. 2. In practice, the tasks, functions, and operations may be performed by different elements of the described system, such as the wireless switch 104, 200, the processor 206, the wireless access devices 102, and/or the mobile devices 110. It should be appreciated any number of additional or alternative tasks may be included, and may be incorporated into a more comprehensive procedure or process having additional functionality not described in detail herein.

Referring now to FIG. 3, and with continued reference to FIG. 1 and FIG. 2, a load balancing process 300 may initialize when a wireless network begins operation, for example, upon initialization of the wireless network or upon resuming operation after regularly scheduled maintenance or downtime. In accordance with one embodiment, the load balancing process 300 initializes when a wireless switch is turned on or otherwise begins operation. In an exemplary embodiment, the load balancing process 300 is adapted to identify balancing criteria or a load metric for balancing the load in the wireless network (task 302). In accordance with one embodiment, the balancing criteria may be pre-coded in the wireless switch (e.g., in processor 206 and/or switching logic 208). In an exemplary embodiment, the balancing criteria may be determined subjectively and input manually by a network administrator or another user responsible for configuring and supervising operation of the wireless network. Accordingly, the balancing criteria may vary to suit the needs of a given wireless network. The load across access devices may be balanced based on a number of different balancing criteria or load metrics associated with each respective access device, such as, for example, the number of mobile devices associated with each access device, the data rate or throughput for each access device, the type of content being transmitted by and/or associated with each access device, or the packet count transmitted by and/or associated with each access device.

In an exemplary embodiment, the load balancing process 300 is configured to group the access devices on the wireless network into one or more groups (task 304). The access devices may be grouped based on one or more grouping criteria (e.g., location or proximity). In accordance with one embodiment, the access devices are grouped by manually configuring the wireless switch associated with the access devices. In an alternative embodiment, the wireless switch may be configured to automatically group the access devices. The wireless switch may be configured to group all the access devices associated with the wireless switch in a single group as part of the default settings for the wireless switch in the absence of any manual or automatic grouping. In an exemplary embodiment, the wireless switch may be configured to maintain the groups of access devices in a database, along with the data and/or load information associated with each of the access devices corresponding to the identified balancing criteria.

Figure 4:
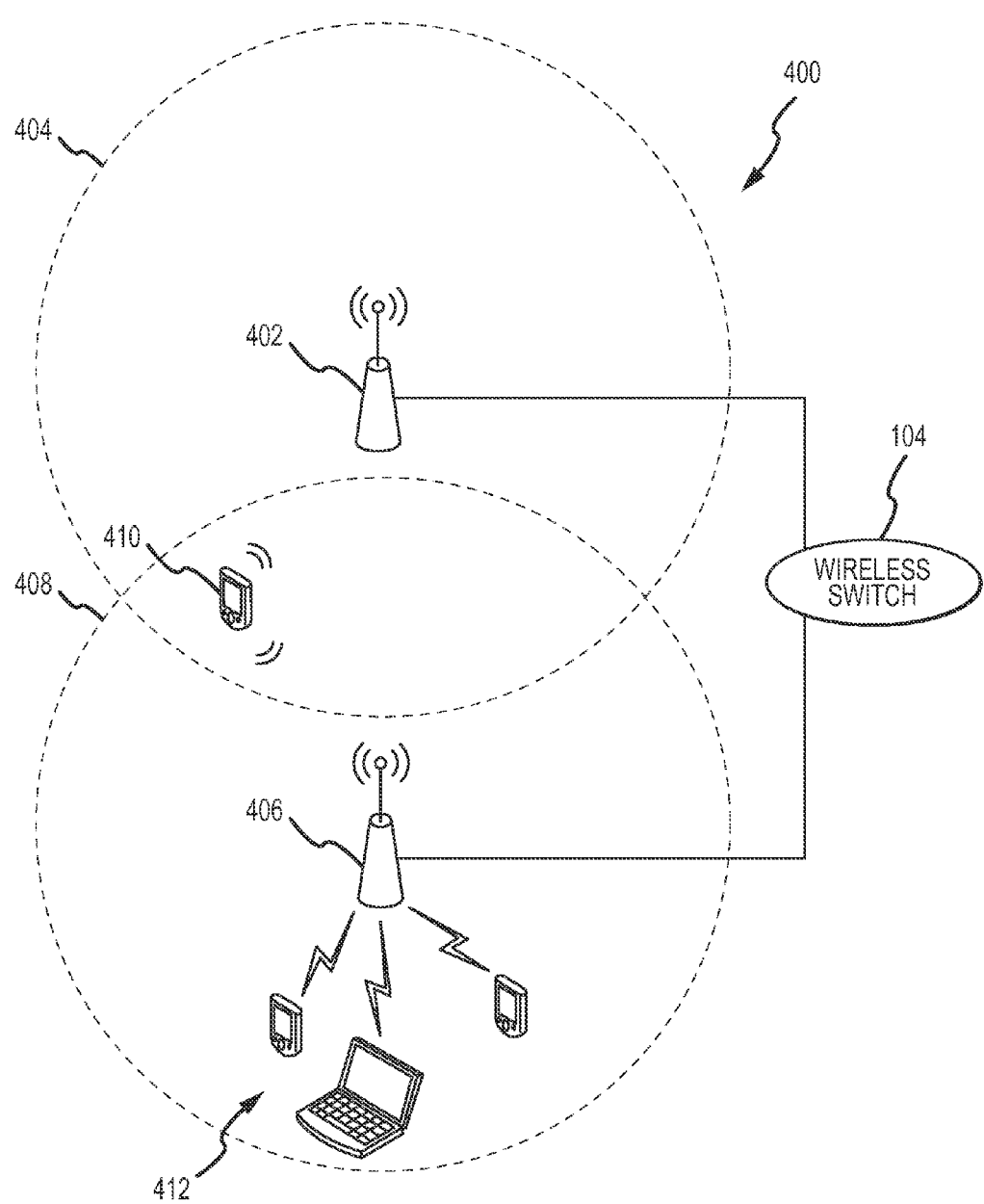
FIG. 4 is a schematic representation of an exemplary wireless network suitable for use with the load balancing process of FIG. 3 in accordance with one embodiment.

Referring now to FIG. 3 and FIG. 4, in an exemplary embodiment, the access devices are ordered into groups based upon their proximity (or location relative) to one another. For example, a first access device 402 may have a broadcast or communication range 404 where the signal strength is sufficient for most mobile devices to communicate with the first access device 402 when within the range 404. Similarly, a second access device 406 will also have an associated broadcast or communication range 408. In an exemplary embodiment, the access devices 402, 406 are grouped in a first group if there is enough overlap of their respective communication ranges 404, 408 such that an unassociated mobile device near one of the access devices 402, 406 would have a relatively equal likelihood of establishing a connection to the other access device 402, 406. In accordance with one embodiment, neighboring (e.g., adjacent) access devices in a wireless network 400 may be ordered in groups of two to simplify the task of determining how to group the access devices.

In an exemplary embodiment, the load balancing process 300 is configured to wait until receiving an association request from a mobile device at an access device (task 306). In accordance with one embodiment, the access device may simply route the association request to the wireless switch for further processing. In an exemplary embodiment, the load balancing process 300 is configured to determine if the access device that received the association request is the least-loaded access device (task 308). In an exemplary embodiment, the wireless switch is configured to determine if the access device is the least-loaded access device among one or more access devices grouped with the access device. The wireless switch may determine a respective load metric value based on the balancing criteria for each of the access devices in the group. The wireless switch may analyze the respective load metric value for the access device receiving the association request by comparing the respective load metric value for the access device with the respective load metric value for each access device of the group to determine if the access device is the least-loaded access device. In an exemplary embodiment, the load balancing process 300 is configured to grant the association request if the access device receiving the association request is the least-loaded access device (task 310).

For example, referring to FIG. 4, a first access device 402 and a second access device 406 may be ordered into a group at the wireless switch 104. It should be understood that in practice, there may be more than two access devices grouped together, and the exemplary case is presented with only two access devices for ease of description and is not limiting. Assuming data throughput is identified as the balancing criterion, the wireless switch 104 (e.g., data traffic monitor 204) may monitor the throughput for each access device 402, 406. In another embodiment, if the number of associated mobile devices is the balancing criterion, the wireless switch 104 may maintain information regarding number of mobile devices associated with each access device 402, 406. It should be appreciated that these are merely two exemplary balancing criteria for ease of description, and that numerous other possible criterion may be implemented in practical embodiments.

As shown, the second access device 406 may have a plurality of mobile devices 412 associated with it, while the first access device 402 does not have any associated mobile devices. In the exemplary case, if the balancing criterion is identified as the number of devices associated with an access device, when the unassociated mobile device 410 sends an association request to the first access device 402, the wireless switch 104 may identify the first access device 402 as the least-loaded access device. The wireless switch 104 may be configured to grant the association request by sending an association response indicating acceptance via the first access device 402. Similarly, if throughput were used as the balancing criterion, the first access device 402 would likely have a lower throughput than the second access device 406, and thus identified as the least-loaded access device.

Referring again to FIG. 3, in an exemplary embodiment, if the access device receiving the association request is not identified as the least-loaded access device, the load balancing process 300 may be configured to store identification information for the mobile device associated with the association request (task 312). For example, the wireless switch may be configured to maintain (e.g., in database 214) device-specific identifying information (e.g., an associated MAC address or username), along with information indicating the number of association requests received from the mobile device, and the time (e.g., timestamp) associated with each association request.

In an exemplary embodiment, the load balancing process 300 is configured to determine whether it should override the balancing criteria by comparing the identification information associated with the mobile device to an override criterion (task 314). For example, some mobile devices may continue to send association requests to the same access device, instead of attempting association with another access device on the network (e.g., no other access device in range or mobile device is malfunctioning), in which case the mobile device may require a prolonged (if not indefinite) period of time to establish a connection in the absence of an override condition.

In another case, depending on the balancing criteria, two access devices may have a relatively equal average load but experience minor fluctuations during operation (e.g., throughput and/or data rate generally varies and is not static). For example, at time $t_1$, a mobile device may attempt to associate with an access device which is not the least-loaded device. At time $t_2$, the mobile device may then attempt to associate with a second access device, which was the least-loaded device, at time $t_1$, but is no longer the least-loaded device. It may be possible for the least-loaded device to change at a rate, such that the mobile device would require a prolonged period of time to establish a connection. In accordance with one embodiment, the wireless switch 104 may be configured to utilize a threshold metric value to identify the least-loaded access device and/or determine whether the association request should be granted to avoid this situation (e.g., always grant the association if the access device throughput is less than a threshold value).

In these situations described above, it is often desirable to grant the association request and allow the mobile device to connect to the wireless network, in order to maintain a satisfactory experience on behalf of the user of the mobile device, even though granting the association may not satisfy the load balancing criteria. In an exemplary embodiment, the wireless switch is configured to override the balancing criteria and grant the association request if the mobile device has been attempting to establish a connection for greater than a specified period of time. In one embodiment, the specified period of time is chosen to be approximately ten seconds, which should be enough time to allow the mobile device to attempt to associate with multiple access devices without greatly impairing the user experience. In an alternative embodiment, the wireless switch may be configured to override the balancing criteria and grant the association request based on the number of failed association attempts the mobile device has made; this addresses the scenario where a persistent mobile device stubbornly attempts to associate with a particular access device even though previous association requests have been denied. However, different mobile devices may respond to a failed association attempt differently (e.g., some mobile devices attempt another association at a greater rate than others). Therefore, it is believe that using a specified period of time as the override criterion results in a more consistent behavior and a load balancing process that is more independent of the mobile device. It should be appreciated that the load balancing process 300 may be implemented without storing identification information and making an override decision (task 312, task 314), and these steps are optional features that improve or safeguard the user experience while still attempting to balance the load on the wireless network.

In an exemplary embodiment, the load balancing process 300 is configured to deny the association request if the access device associated with the association request is not the least-loaded access device (task 316). For example, referring again to FIG. 4 and the example case discussed above using the number of mobile devices as the balancing criteria, if the unassociated mobile device 410 sends an association request to the second access device 406, the wireless switch 104 may be configured to deny the association request (e.g., by sending a response indicating rejection via the second access device 406). In an exemplary embodiment, the mobile device 410 is configured to select a different access device (e.g., access device 402) and attempts to associate by sending another association request to the different access device. The loop defined by tasks 306, 308, 310, 312, 314, and 316 may repeat as needed until the mobile device 410 successfully connects to the wireless network 400 or the association procedure times out.

In alternative embodiments, the load balancing process 300 may be implemented to accommodate (or apply to) reassociation requests (e.g., when a mobile device that has already been associated with an access device is roaming throughout an area serviced by a wireless network). For example, if a mobile device roams away from a currently associated access device and finds another access device having a stronger beacon signal, the mobile device may send a reassociation request to the new access device, as will be understood. However, performing load balancing process 300 in response to reassociation requests may result in unwanted or undesirable experiences for a user of a mobile device. For example, if the mobile device is in the process of transmitting data using the associated access device and sends a reassociation request to the new access device that is subsequently denied by the wireless switch 104, the mobile device may suffer from a loss of data and/or the data communication link if the mobile device is no longer within the communication range of the associated access device. Thus, in accordance with one embodiment, reassociation requests are automatically granted to prevent any undesirable loss of data or otherwise restricting the ability to roam and/or location of a mobile device in the wireless network.

It should be appreciated that the load balancing process 300 described above may be implemented without reliance on a wireless switch by utilizing access points that have the various network intelligence and management functions incorporated therein. However, this decentralized management structure becomes more complicated to implement as the size of the wireless network and number of access points in the network increases. For example, in order to achieve the performance described above, it may require identically configuring each individual access point as opposed to merely configuring the wireless switch. Furthermore, the decentralized system may also require that each access point be compatible with a certain protocol and/or identical devices provided by the same vendor or manufacturer.

It should be appreciated that the subject matter described herein enables load balancing among access devices in a wireless network in a customizable way that is independent of the types or brands of mobile devices and/or access devices in the network. For example, the wireless switch may be configured by a network administrator to group access devices in a certain manner, and balance the load among them using a desired balancing criterion. Furthermore, the load balancing process may be adapted to override the load balancing or automatically grant reassociation requests to ensure a satisfactory user experience.

While at least one example embodiment has been presented in the foregoing detailed description, it should be appreciated that a vast number of variations exist. It should also be appreciated that the example embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for balancing a load across a plurality of access devices having a least-loaded access device, the method comprising:
   receiving an association request at a first access device of the plurality of access devices, including a wireless switch storing identification information for a mobile device associated with the association request, wherein if the association request is repeated at the first access device by an identified mobile device for a predetermined number of times, further comprising granting the association request; otherwise
   determining, in response to the association request, if the first access device is the least-loaded access device;
   granting the association request if the first access device is the least-loaded access device; and
   denying the association request by sending a rejection response if the first access device is not the least-loaded access device.

2. The method of claim 1, further comprising routing the association request by the first access device to the wireless switch for performing the determining, granting, and denying steps.

3. The method of claim 1, wherein the predetermined number of times must occur within a specified period of time.

4. The method of claim 1, wherein determining if the first access device is the least-loaded access device further comprises:
   monitoring a throughput for each of the plurality of access devices by the wireless switch; and
   if the first access device has a lowest throughput among the plurality of access devices, identifying the first access device as the least-loaded access device.

5. The method of claim 1, wherein determining if the first access device is the least-loaded access device further comprises:
   monitoring a throughput metric for each of the plurality of access devices by the wireless switch; and
   if the throughput metric for the first access device is less than a threshold throughput metric value, identifying the first access device as the least-loaded access device.

6. The method of claim 1, wherein determining if the first access device is the least-loaded access device further comprises:
   monitoring a respective number of mobile devices associated with each of the plurality of access devices by the wireless switch; and
   if the first access device has a lowest number of mobile devices associated therewith, identifying the first access device as the least-loaded access device.

7. The method of claim 1, further comprising grouping the first access device with a second access device to create a group if a communication range of the second access device overlaps a communication range of the first access device, where the mobile device has a substantially equal likelihood of establishing a connection to either access device.

8. The method of claim 1, further comprising automatically granting a reassociation request by the first access device.

9. A wireless switch for a computer network, the wireless switch comprising:
   a communication module, the communication module being configured to communicate with a plurality of access devices on the computer network, and the communication module being configured to receive an association request from a first access devices on the computer network;
   a storage module configured to store identification information for a mobile device associated with the association request;
   a processor coupled to the communication module; and
   a database coupled to the processor, wherein the processor and the database are cooperatively configured to:
   maintain load information associated with each of the plurality of access devices;
   if the association request is repeated at the first access device by an identified mobile device for a predetermined number of times, grant the association request; and
   if the association request has not otherwise been granted by the wireless switch:
   process the association request for a the first access device;
   determine, in response to the association request, if the first access device is a least-loaded access device based on load information associated with each access device;
   grant the association request if the first access device is the least-loaded access device; and
   deny the association request by sending a rejection response if the first access device is not the least-loaded access device.

* * * * *

UNITED STATES PATENT AND TRADEMARK OFFICE
CERTIFICATE OF CORRECTION

| | |
|---|---|
| PATENT NO. | : 8,223,732 B2 |
| APPLICATION NO. | : 12/141685 |
| DATED | : July 17, 2012 |
| INVENTOR(S) | : Li |

It is certified that error appears in the above-identified patent and that said Letters Patent is hereby corrected as shown below:

In Column 12, Line 18, in Claim 9, delete "devices" and insert -- device --, therefor.

In Column 12, Line 33, in Claim 9, delete "switch:" and insert -- switch; --, therefor.

In Column 12, Line 34, in Claim 9, delete "for a the" and insert -- for the --, therefor.

Signed and Sealed this
Twenty-second Day of January, 2013

David J. Kappos
*Director of the United States Patent and Trademark Office*